United States Patent
Wang

(10) Patent No.: US 9,837,928 B1
(45) Date of Patent: Dec. 5, 2017

(54) SINGLE FIRE-WIRE PHASE-FRONT DYNAMIC AC POWER FETCHING MODULE

(71) Applicant: LOONG YEE INDUSTRIAL CORP., LTD., New Taipei (TW)

(72) Inventor: Chi-Jen Wang, New Taipei (TW)

(73) Assignee: LOONG YEE INDUSTRIAL CORP., LTD., New Taipei (TW)

(*) Notice: Subject to any disclaimer, the term of this patent is extended or adjusted under 35 U.S.C. 154(b) by 0 days.

(21) Appl. No.: 15/469,475

(22) Filed: Mar. 24, 2017

(51) Int. Cl.
*H02M 7/23* (2006.01)
*H02M 1/08* (2006.01)
*H02M 5/458* (2006.01)
*H02M 7/25* (2006.01)

(52) U.S. Cl.
CPC .............. *H02M 7/23* (2013.01); *H02M 1/083* (2013.01); *H02M 5/458* (2013.01); *H02M 5/4585* (2013.01); *H02M 7/25* (2013.01)

(58) Field of Classification Search
CPC ...... H02M 5/4585; H02M 1/083; H02M 7/23; H02M 7/25; G05F 3/04; H02P 29/0044
See application file for complete search history.

(56) References Cited

U.S. PATENT DOCUMENTS 8,053,924 B2 * 11/2011 Wang .................... H02M 5/293
307/31
9,535,443 B1 * 1/2017 Wang ........................ G05F 3/04

* cited by examiner

*Primary Examiner* — Gary L Laxton
*Assistant Examiner* — Kyle J Moody
(74) *Attorney, Agent, or Firm* — Chun-Ming Shih

(57) ABSTRACT

A single fire-wire phase-front dynamic AC power fetching module, comprising: two series-connected type synchronous power fetching circuits connected in parallel, and an electronic switch connected thereto, one series-connected type synchronous power fetching circuit is used to perform positive phase AC power fetching, while the other series-connected type synchronous power fetching circuit is used to perform negative phase AC power fetching. The electronic switch is formed by a relay or a silicon control crystal (TRIAC) controlled by an MCU microprocessor. As such, through adopting bi-directional dynamic full-bridge type power fetching, for a single fire wire, it is able to perform power fetching twice in a cycle. The duration of power fetching can be regulated automatically depending on the load, to compensate for the power, and supply it to an outside circuit as the basic power supply.

5 Claims, 10 Drawing Sheets

SINGLE FIRE-WIRE PHASE-FRONT DYNAMIC AC POWER FETCHING MODULE

BACKGROUND OF THE INVENTION

Field of the Invention

The present invention relates to a dynamic AC power fetching module, and in particular to a single fire-wire phase-front dynamic AC power fetching module used in bi-directional dynamic full-bridge type power fetching. Wherein, on a single fire wire, power fetching is performed twice in a cycle of AC. The duration of power fetching can be regulated automatically depending on the load, to compensate for the power, and supply it to an outside circuit as the basic power supply.

The Prior Arts

In general, electric products utilize DC current as power supply. For example, in an application, a sensor is connected to a switch, that is in turn connected to a display/alarm, or other electronic device/system to perform the function required. The shortcoming of this configuration is that, since the sensor and the electronic products have to consume power of a battery, so the battery must be replaced periodically, otherwise they can not work for lack of power.

Presently, with regard to power fetching for the local power supply AC of 50 Hz or 60 Hz, various designs have been proposed, so that the power fetching circuit can be connected speedily to the local power supply for a short period of a cycle, to obtain an instantaneous AC current. Then, that current is rectified into a basic power supply, and is supplied to an outside circuit. However, all these designs lack the synchronous function, such that the power fetching circuit thus designed has quite a lot of shortcomings and deficiencies. For this reason, in recent years, efforts have been made to add synchronous functions to the power fetching circuit, so that when it is connected to the fire wire of a power supply, it is capable of performing synchronous power fetching periodically, to provide synchronous and stable DC power to an outside circuit as the basic power supply.

Currently, the illumination power consumption constitutes an increasing percentage of total global power consumption. Therefore, various countries in the world have dedicated to the development of intelligent illumination and management of energy saving through making use of Internet of Things. In this respect, the intelligent switch plays an important role in the intelligent illumination.

In recent years, the Internet of Things has become very popular and has wide applications, yet it has to be accessed through connecting network to it by means of wireless communication technology. In this respect, the application of intelligent household includes: home security, door access control, indoor air conditioning and energy control, and illumination light control, etc. All the applications mentioned above require to use a wireless communication module, yet the conventional half-wave power fetching is not sufficient to provide the power required, such that battery power has to be provided. In addition, for the various sensors used for detecting temperature, humidity, air pressure, current, voltage, air quality, battery power is required. Therefore, battery must be replaced frequently and periodically, to cause battery pollution problems. For this reason, it is not cost effective and not environment friendly.

Further, another shortcoming of the existing technology is that, the conventional single fire-wire AC power fetching is achieved by using the voltage difference produced by the delayed connection-and-disconnection of a lamp load through a TRIAC. Basically, the AC power supply is of a frequency of 50 Hz/60 Hz, while AC power fetching is performed twice in this period. In this way, greater Electromagnetic Interference (EMI) noise is produced, When the power for the lamp load is increased, the EMI noise will be increased.

Therefore, presently, the design and performance of the power fetching circuit is not quite satisfactory, and it leaves much room for improvement.

SUMMARY OF THE INVENTION

In view of the problems and drawbacks of the prior art, the present invention provides a single fire-wire phase-front dynamic AC power fetching module, to overcome the shortcomings of the prior art.

The present invention provides a single fire-wire phase-front dynamic AC power fetching module, comprising: two series-connected type synchronous power fetching circuits connected in parallel, and an electronic switch connected thereto. Wherein, one series-connected type synchronous power fetching circuit is used to perform positive phase AC power fetching, while the other series-connected type synchronous power fetching circuit is used to perform negative phase AC power fetching.

The series-connected type synchronous power fetching circuit includes a synchronous rectifier outside power supply unit, a synchronous rectifier inside power supply unit, a synchronous AC voltage control unit, an FET driven zero-crossing control unit, a synchronous load dynamic regulating unit, and a synchronous zero-crossing AC power fetching unit.

The electronic switch is formed by a relay or a silicon control crystal (TRIAC) controlled by an MCU microprocessor.

In the present invention, a bi-directional dynamic full-bridge type power fetching design is adopted, to achieve the advantage of fast synchronous speed, sufficient power fetching amount, high power fetching efficiency, and low dissipation heat. Wherein, on a single fire wire, power fetching is performed twice in a cycle of AC. Depending on the load, the duration of power fetching can be regulated automatically to compensate for the power, to be used as a basic power supply to an outside circuit. As such, the major characteristics of the present invention are that: it is capable of providing DC power of 3.3V at 350 mA, that is quite sufficient for the operation of Wi-Fi, wireless communication module, and sensor. Therefore, the present invention has the benefits of achieving cost saving for not requiring battery, eliminating the battery pollution problem, and avoiding adding an N-phase wire in the circuit layout.

Further, another advantage of the present invention is that, in the present invention, the bi-directional single fire-wire phase-front AC power fetching is adopted. In which, AC power fetching is achieved through voltage division of the lamp load. For an AC power supply of 50 Hz/60 Hz, the AC power fetching is performed twice, while in this period, there is no need to disconnect the lamp load, to reduce the EMI noises effectively. As such, when the power for the lamp load is increased, the EMI noise will not be increased.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
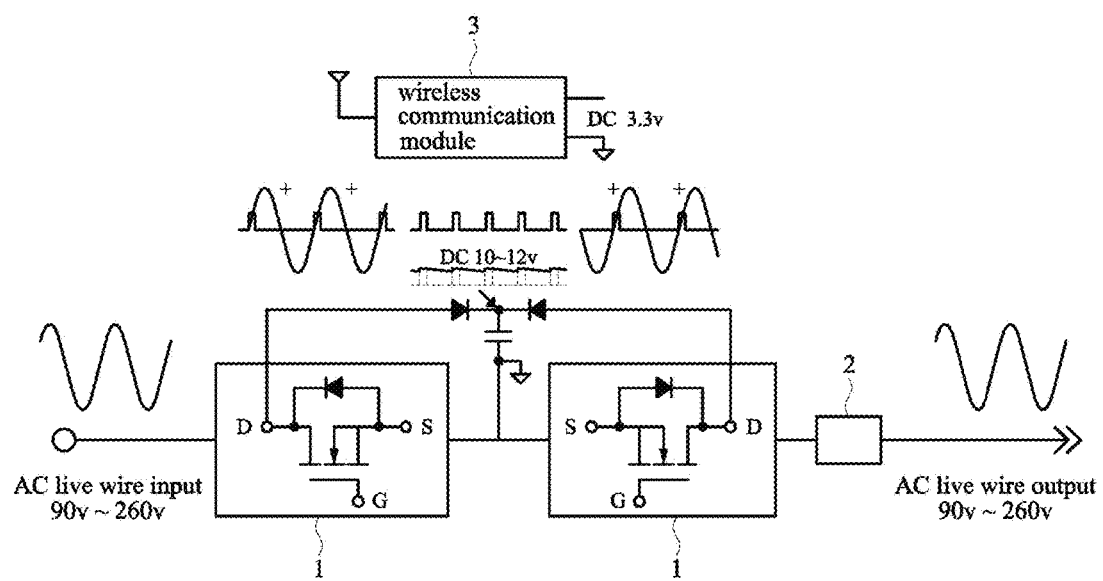
FIG. 1 is a block diagram of an equivalent circuit for a single fire-wire phase-front dynamic AC power fetching module according to the present invention.
Figure 2A:
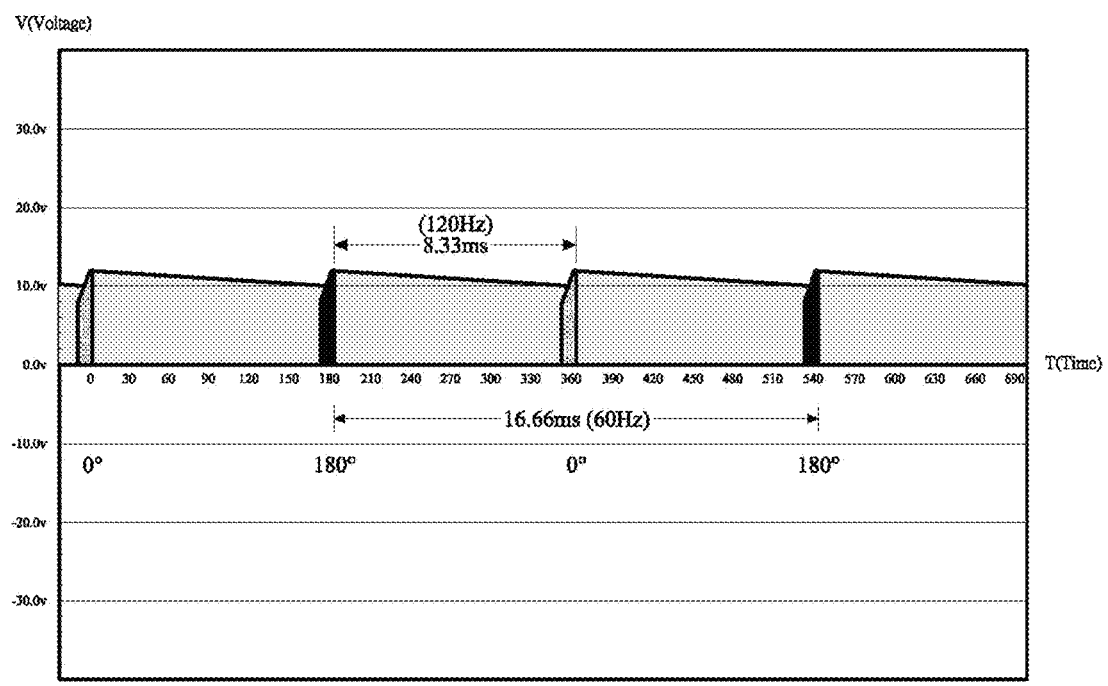
FIG. 2A is a schematic diagram for a full-bridge type positive and negative bi-directional power fetching according to the present invention.
Figure 2B:
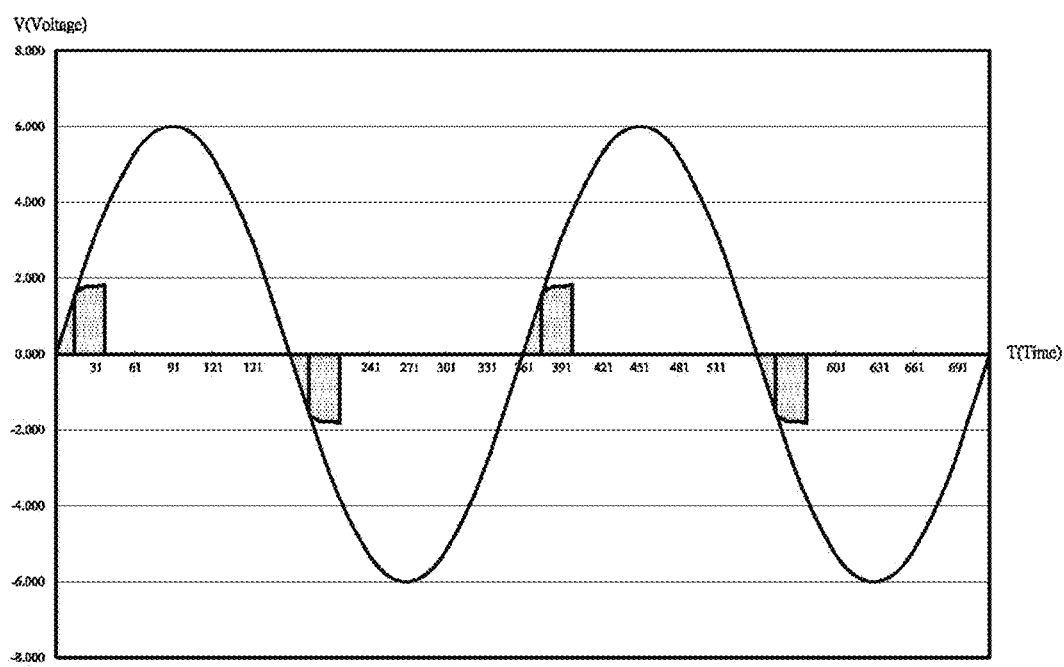
FIG. 2B is a waveform diagram for a full-bridge type bi-directional AC power fetching according to the present invention.

The purpose, construction, features, functions and advantages of the present invention can be appreciated and understood more thoroughly through the following detailed descriptions with reference to the attached drawings.

Refer to FIGS. 1 to 4 respectively for a block diagram of an equivalent circuit for a single fire-wire phase-front dynamic AC power fetching module according to the present invention; a schematic diagram for a full-bridge type positive and negative bi-directional power fetching according to the present invention; a waveform diagram for full-bridge type bi-directional AC power fetching according to the present invention; a block diagram for a single fire-wire phase-front dynamic AC power fetching module according to the present invention; and a circuit diagram for a single fire-wire phase-front dynamic AC power fetching module according to the present invention.

As shown in FIGS. 1 to 4, the present invention provides a single fire-wire phase-front dynamic AC power fetching module, comprising: two series-connected type synchronous power fetching circuits 1 connected in parallel, and an electronic switch 2 connected thereto. Wherein, one series-connected type synchronous power fetching circuit 1 is used to perform positive phase AC power fetching, while the other series-connected type synchronous power fetching circuit 1 is used to perform negative phase AC power fetching.

The series-connected type synchronous power fetching circuit 1 includes a synchronous rectifier outside power supply unit 11, a synchronous rectifier inside power supply unit 12, a synchronous AC voltage control unit 13, an FET driven zero-crossing control unit 14, a synchronous load dynamic regulating unit 15, and a synchronous zero-crossing AC power fetching unit 16.

One end of the synchronous rectifier outside power supply unit 11 is connected to the fire wire of a power supply, while the other end is connected to a stable DC voltage output end.

One end of the synchronous rectifier inside power supply unit 12 is connected to the fire wire of a power supply, while the other end is provided with a first branch connecting to one end of the synchronous load dynamic regulating unit 15 and the synchronous AC voltage control unit 13; and the other end is further provided with a second branch connecting to the FET driven zero-crossing control unit 14, the synchronous zero-crossing AC power fetching unit 16, and the other end of the synchronous load dynamic regulating unit 15.

One end of the FET driven zero-crossing control unit 14 is connected to the second branch of the synchronous rectifier inside power supply unit 12, and it is also connected to and controls the synchronous zero-crossing AC power fetching unit 16; while the other end of the FET driven zero-crossing control unit 14 is connected to and controlled by the synchronous AC voltage control unit 13.

The synchronous zero-crossing AC power fetching unit 16 is connected to and controlled by the FET driven zero-crossing control unit 14, and it is provided with a power fetching synchronous sampling end, connected to and controls the synchronous load dynamic regulating unit 15 and the synchronous AC voltage control unit 13. Further, one end of the synchronous zero-crossing AC power fetching unit 16 is connected to the fire wire, while its other end is connected to the synchronous zero-crossing AC power fetching unit 16 of the other series-connected type synchronous power fetching circuit 1 connected in parallel.

Figure 3:
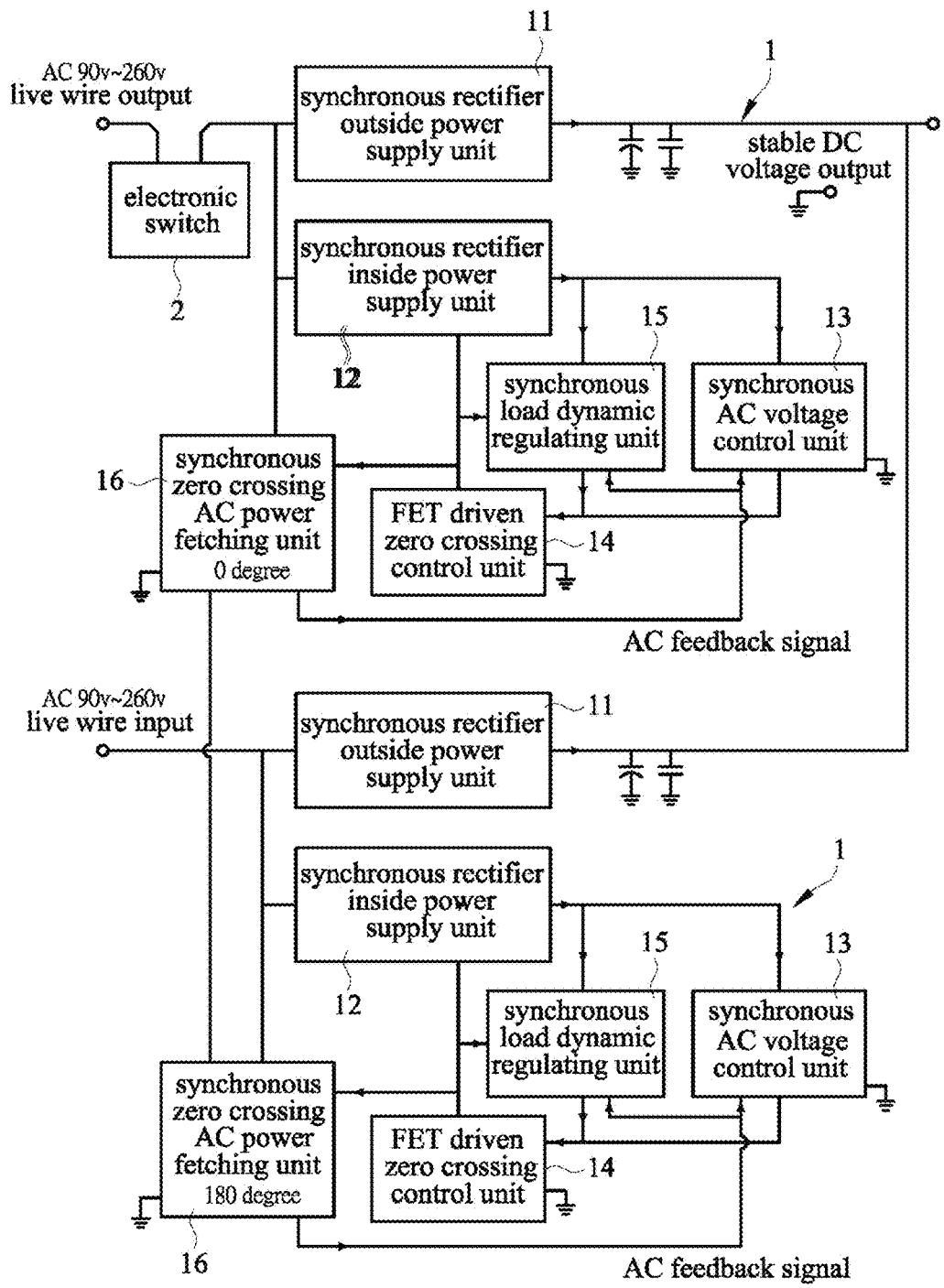
FIG. 3 is a block diagram for a single fire-wire phase-front dynamic AC power fetching module according to the present invention.
Figure 4:
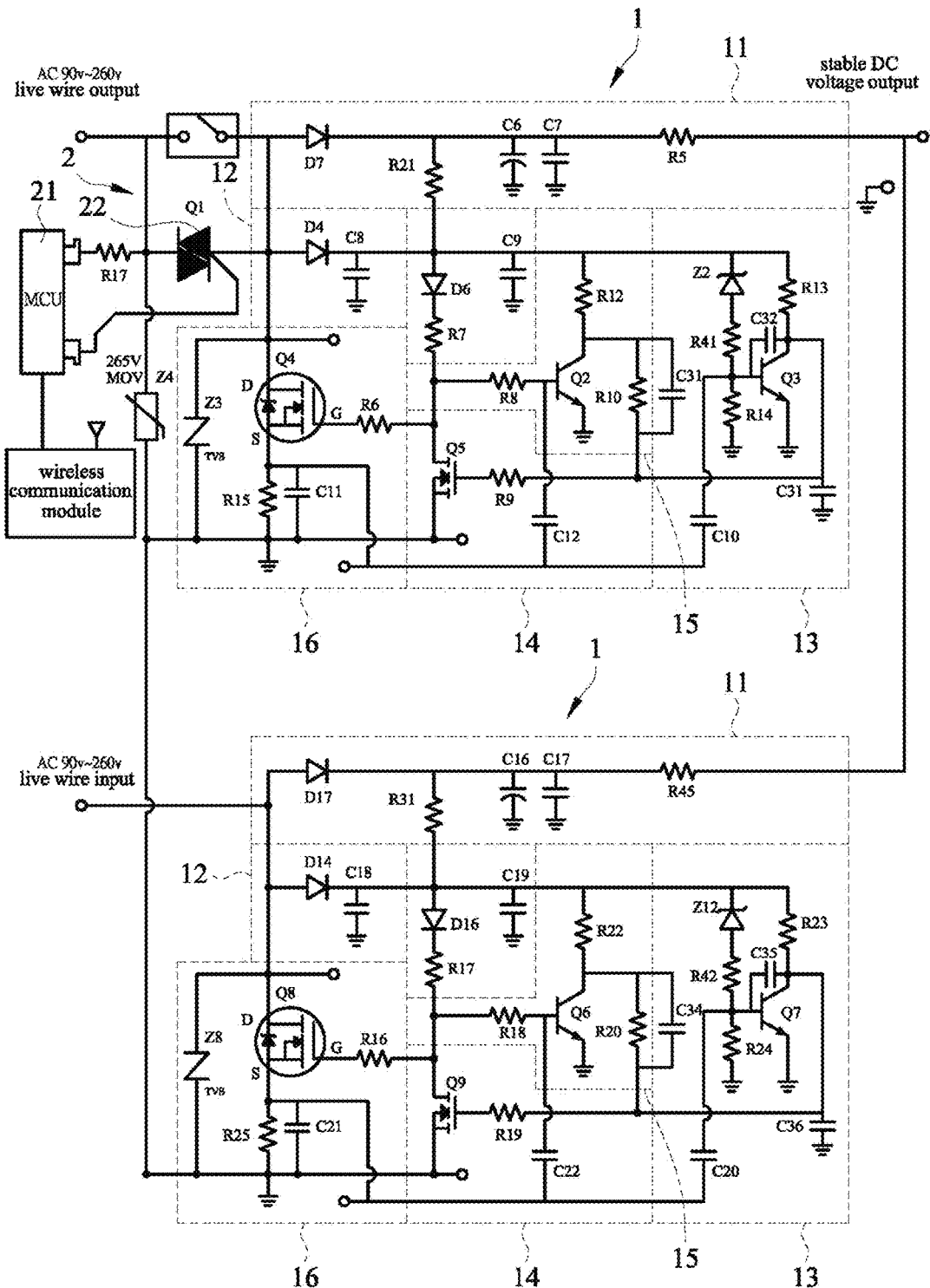
FIG. 4 is a circuit diagram for a single fire-wire phase-front dynamic AC power fetching module according to the present invention.

As shown in FIG. 3, to be more specific, the present invention is connected in series directly to the fire wire of a power supply, to perform synchronous power fetching periodically, to provide static low power, and then that is processed to produce high efficiency synchronous DC voltage output, to be used as the basic power supply to the outside circuit. In this respect, the fire wire is designed to have an input end and an output end. Wherein, the synchronous zero-crossing AC power fetching unit 16 of the series-connected type synchronous power fetching circuit 1 is connected to the input end of the fire wire, while the synchronous zero-crossing AC power fetching unit 16 of the other series-connected type synchronous power fetching circuit 1 is connected to the output end of the fire wire. Similarly, the synchronous rectifier outside power supply unit 11 and the synchronous rectifier inside power supply unit 12 of one series-connected type synchronous power fetching circuit 1 are connected to the input end of the fire wire; while the synchronous rectifier outside power supply unit 11 and the synchronous rectifier inside power supply unit 12 of the other series-connected type synchronous power fetching circuit 1 are connected to the output end of the fire wire. The other ends of the two synchronous rectifier outside power supply units 11 are connected in parallel, to form the stable DC voltage output end.

The electronic switch is formed by a relay or a silicon control crystal (TRIAC) 22 controlled by an MCU microprocessor.

Figure 5:
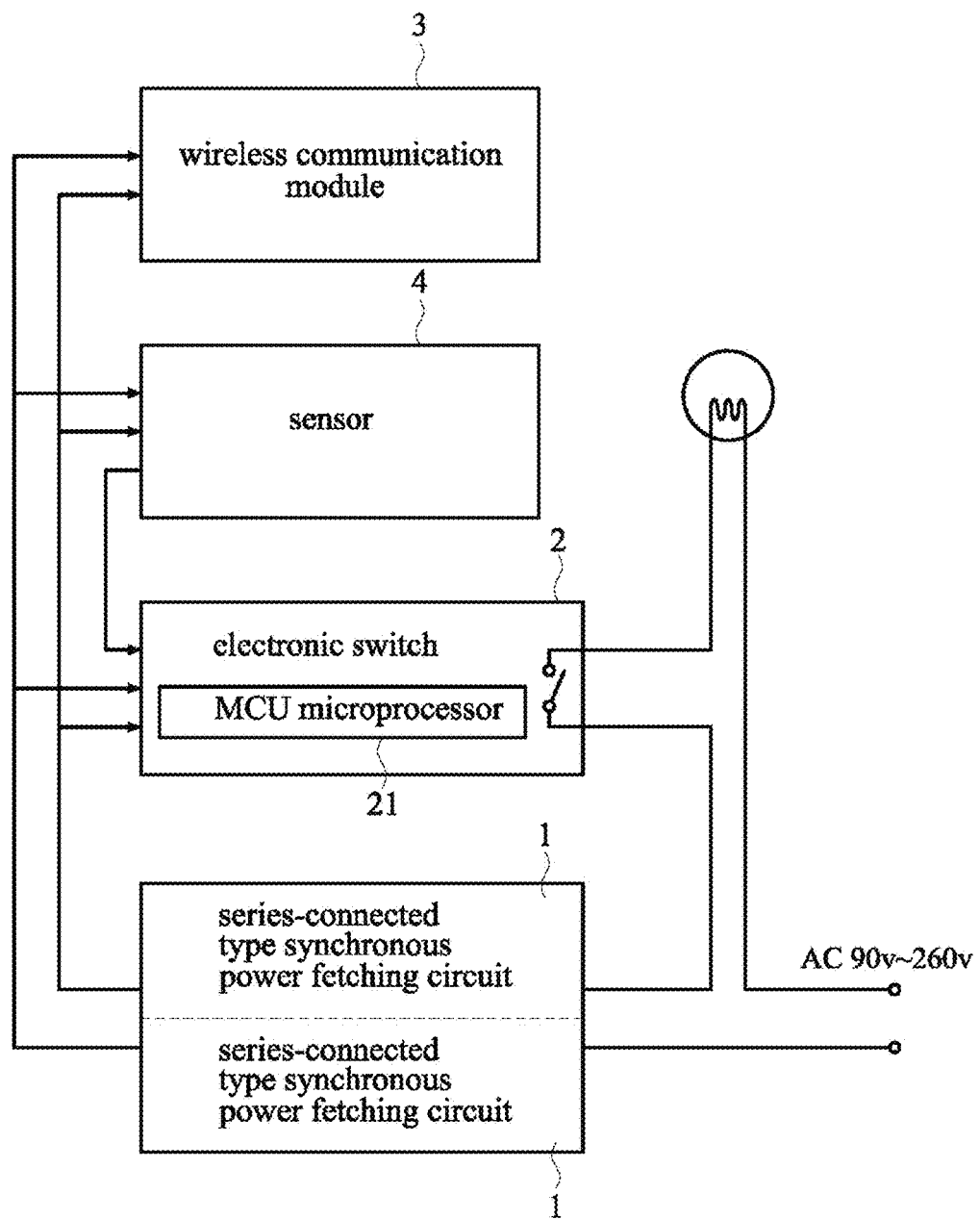
FIG. 5 is a block diagram for an embodiment of a single fire-wire phase-front dynamic AC power fetching module according to the present invention.

Refer to FIG. 5 for a block diagram of an embodiment for a single fire-wire phase-front dynamic AC power fetching module according to the present invention. As shown in FIG. 5, in application, the present invention can be connected to a wireless communication module 3, for it to receive the fetched power, to perform the communication functions required. The wireless communication module 3 for example can be one of the following: a Blue tooth wireless module, a Zigbee wireless module, a Z-wave wireless module, a RF2. 4G wireless module, a 433 MHz wireless module, and a Wi-Fi wireless network module.

Further, in the application of the present invention, the present invention can be connected further to a sensor 4, for it to receive the fetched power, to perform the sensing functions required. The sensor 4 can be one of the following: PIR proximity switch sensor, smoke sensor, carbon monoxide sensor, gas sensor, and door break-in sensor. The electronic switch 2 can be activated to perform switching based on the sensing signals sent from the sensor 4.

As such, in the present invention, for a single fire wire having a voltage within the range 90 V-260V (of 50 Hz or 60 Hz) flowing through, it is able to perform power fetching twice in a cycle (20.0 ms or 16.6 ms), to provide DC power of at least 3.3V at 350 mA, and, that is quite sufficient for the operation of Wi-Fi, wireless communication module 3 and sensor 4. In addition, the present invention has the benefits of cost saving for not requiring battery, eliminating the battery pollution problem, and saving the effort of adding an N-phase wire in the power fetching circuit.

Refer again to FIGS. 3 and 4, for more detailed descriptions for the single fire wire synchronous load dynamic compensation and regulation principle, as explained as follows.

In fetching power through the single fire wire, the single fire-wire power fetching circuit is realized through the following routes: from the fire wire input end through Q8→R25→R15→Q4→ to the electronic switch 2. When providing power at the stable DC voltage output end, the circuit from D7→R5 provides positive phase fetched power (0 degree), while the circuit from D17→R45 provides negative phase fetched power (180 degree), in achieving "full-bridge type bi-directional power fetching". In this configuration, D4 provides power supply (0 degree) for the power fetching control circuit, while D14 provide power supply (180 degree) for the power fetching control circuit. Q3 and Q7 act to perform synchronous zero-crossing. When the single fire wire AC signal passes through the zero crossing point, Q3 and Q7 are activated to cross the zero, to control Q5 and Q9 to drive Q4 and Q8, thus realizing a bi-directional power fetching cycle of 50 Hz or 60 Hz.

In the present invention, as explained as follows, in the respective FIGS. 2A, 2B, 6A, 6B, 7A, 7B, the horizontal axis represents time (T), the vertical axis represents voltage (V), while the characteristic curve represents the voltage response of the power fetched.

Figure 6A:
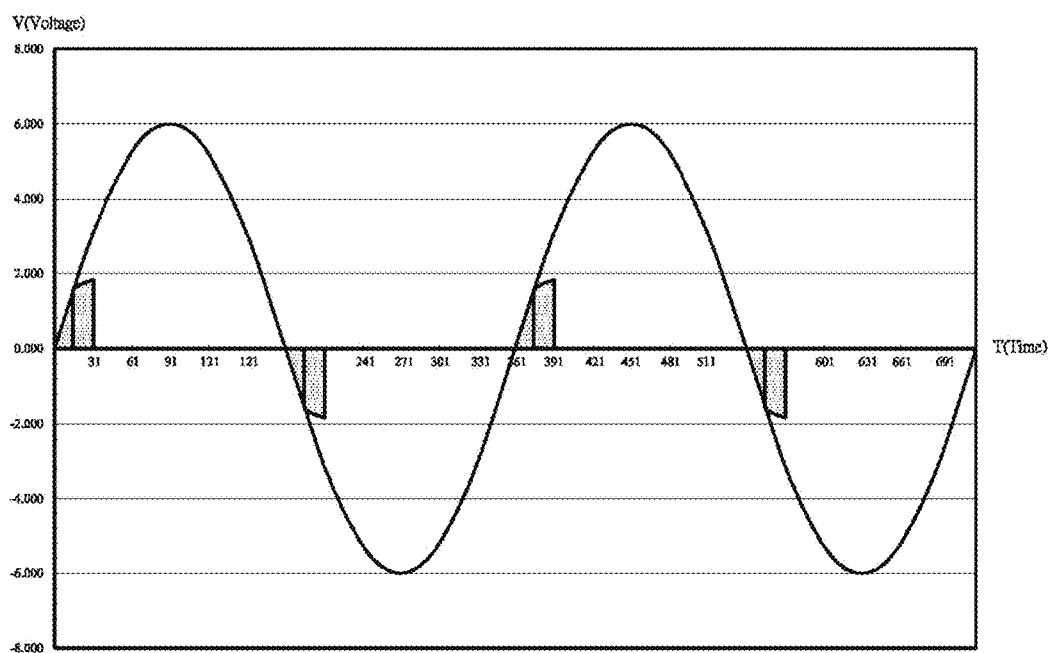
FIG. 6A is a waveform diagram for a single fire-wire dynamic increasing power fetching according to the present invention.

As shown in FIGS. 3 and 6A, when the stable DC voltage output end is subject to an increased load, the power fetching duration is increased for the fetched power (0 degree) passing through R21→D6→R7→R8→Q2→R10→R9→Q5→R6→Q4, and when it passes through D7→R5 it will get increased compensation power instantaneously. Meanwhile, the power fetching duration is increased for the fetched power (180 degree) passing through R31→D16→R17→R18→Q6→R20→R19→Q9→R16→Q8, and when it passes through D17→R45, it will get increased compensation power instantaneously.

Figure 6B:
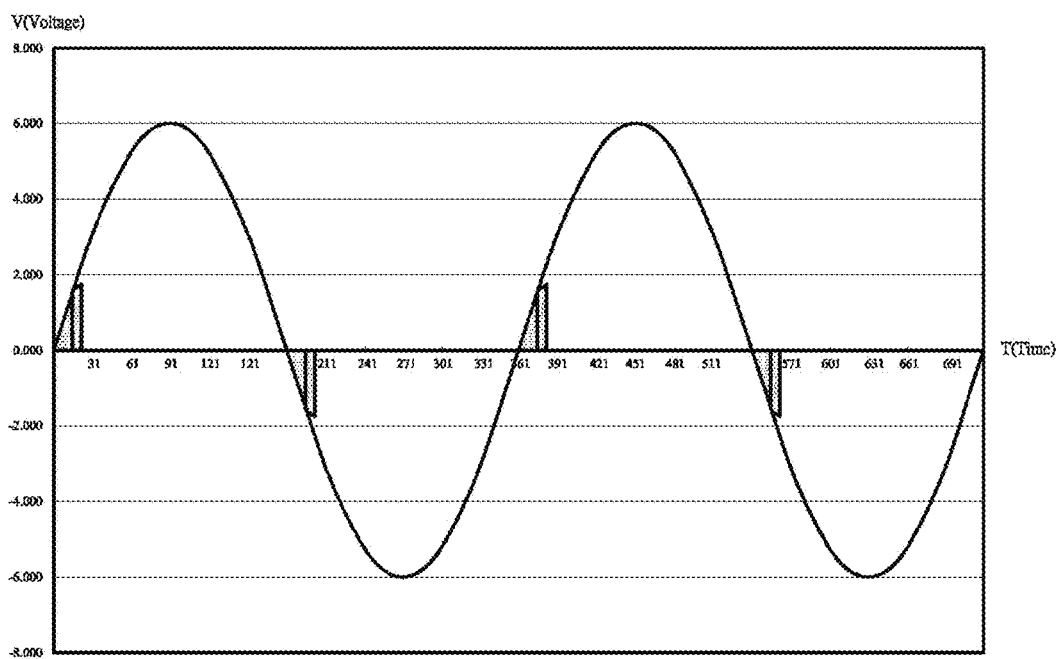
FIG. 6B is a waveform diagram for a single fire-wire dynamic decreasing power fetching according to the present invention.

As shown in FIGS. 3 and 6B, when the stable DC voltage output end is subject to a decreased load, the power fetching duration is decreased for Q4 and Q8, thus the fetched power stable output is decreased.

Figure 7A:
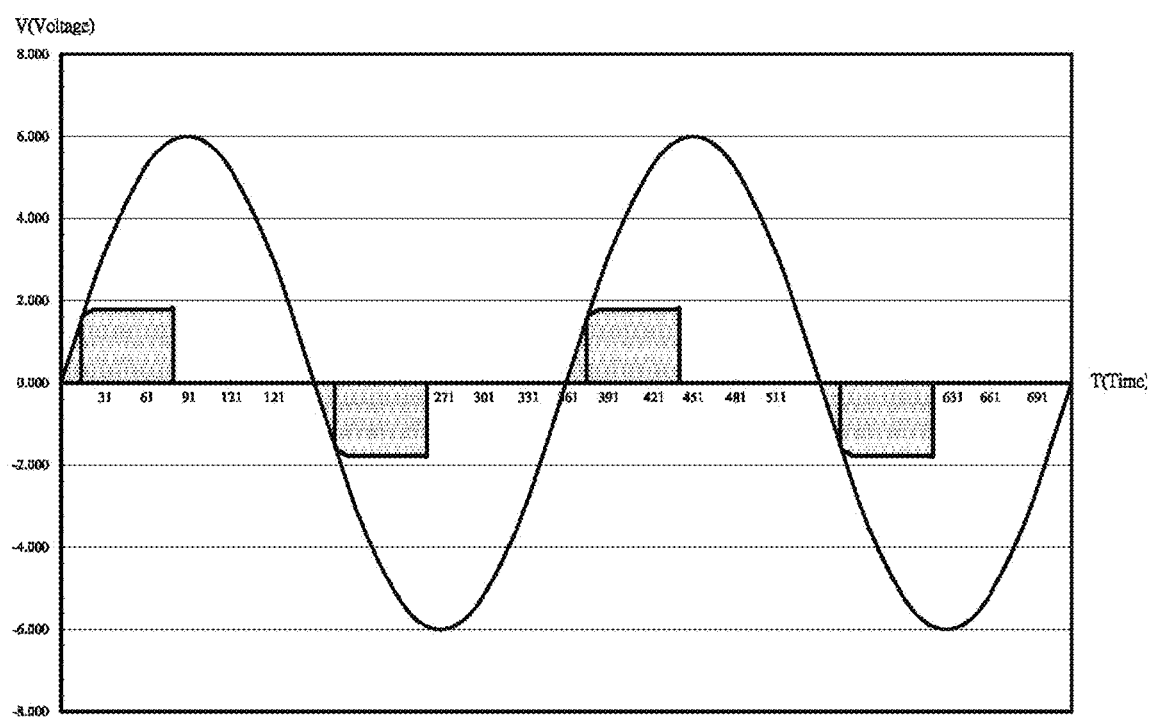
FIG. 7A is a waveform diagram for a single fire-wire dynamic increasing power fetching for a load of an LED lamp according to the present invention.
Figure 7B:
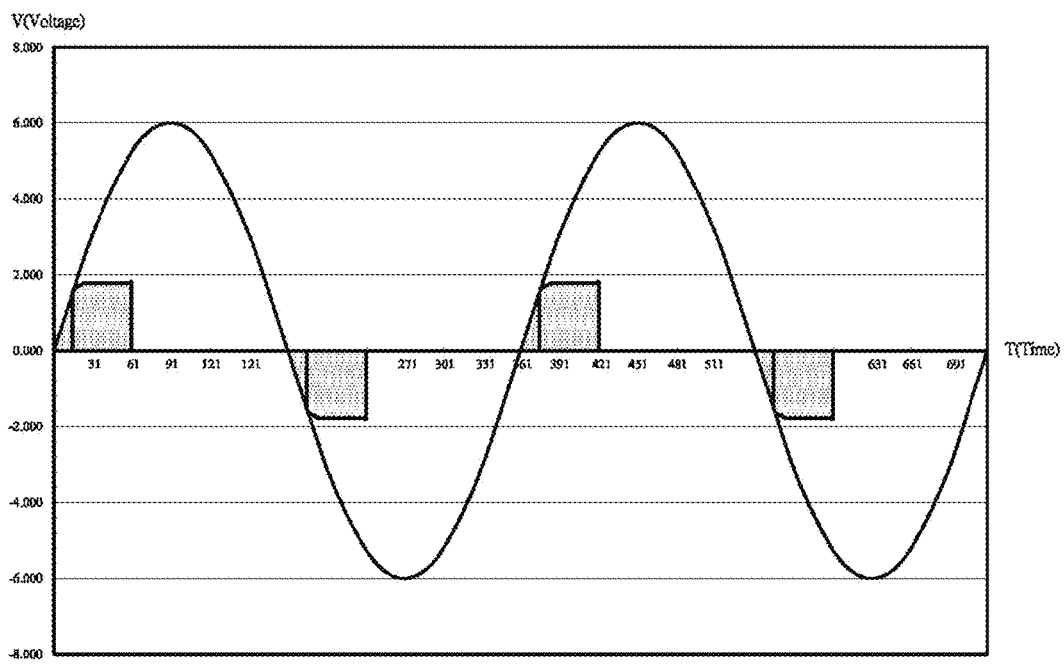
FIG. 7B is a waveform diagram for a single fire-wire dynamic decreasing power fetching for a load of an LED lamp according to the present invention.

Similarly, as shown in FIGS. 7A and 7B, when LED lamp is added as load for the present invention, the single fire wire can also be used to provide dynamic increased power fetching, dynamic decreased power fetching, in achieving the function of automatic regulation of the power supply.

The advantages of the present invention can be summarized as follows:

1. It adopts a bi-directional dynamic full-bridge type power fetching design, to achieve fast synchronous speed, sufficient power fetching amount, high power fetching efficiency, and low dissipation heat.

2. It utilizes Diodes to connect directly to the fire wire end, to provide AC current for the transistors to take samples with frequency of 50 Hz or 60 Hz, to provide AC feedback signals to perform synchronous zero-crossing. As such, it is able to control instantaneously the power MOSFET, to fetch the operation power required for the switch to control the on or off of the lamp. The power thus fetched can be provided to an MCU processor, a wireless communication module, a relay, or a sensor such as a thermometer, or a barometer.

3. It adopts the design concept of virtual zero voltage, such that it can be connected directly in series with the fire wire to fetch power, and supply it to the electronic switch and the wireless communication module. In addition, it can provide synchronous feedback real time, to compensate for power dynamically, in achieving a highly stable circuit.

4. It adopts a virtual zero voltage circuit, such that in performing AC power fetching on the fire wire, the circuit will automatically lock onto the AC current zero crossing point, therefore the DC voltage of the fetched power is used as a reference ground. As such, as long as the zero-crossing power fetching is stable, then the DC output voltage fetched from the fire wire is also stable. In addition, through the synchronous load dynamic regulation, the power amount fetched can be regulated and compensated synchronously real time depending on the total power requirement of the MCU processor, the wireless communication module, and the relay.

Through the application of the present invention, stable DC power output can be obtained by means of AC power fetching on a fire wire, without the need of adding transformer or batteries, thus the maintenance cost is reduced, in achieving energy saving and preventing environment pollution. Also, since the expensive power conversion elements can be replaced and eliminated, the electromagnetic interference (EMI) incurred is reduced. When the inductive load is added to the present invention, it can still work stably.

The most important characteristic of the present invention is that, it adopts a phase-front zero-crossing bi-directional power fetching circuit, to raise its efficiency by more than 50%, as compared with the conventional circuit not having the phase-front and zero-crossing characteristics. When the present invention is connected to a lamp load of low power, only 4 watts are required to be provided, while meeting all the requirements of an illumination lamp. That is quite an improvement over the Prior Art of single-direction series-connection integration power fetching in that, for a load of lamp, 10 watts has to be provided for its normal operation.

In addition, the present invention is provided with dynamic voltage feedback stability function, and dynamic current feedback function, that are specially suitable for the Wi-Fi communication module. Since in a communication mode, the Wi-Fi communication module consumes current more than 300 mA, while in a sleeping mode, it consumes current less than 5 mA, thus causing blinking of the lamp connected in series. The dynamic current feedback function is just right for solving this problem.

Therefore, in the present invention, when the conventional mechanical switch is replaced with the Internet of Things switch making use Wi-Fi, there is no need to add another N-phase wire to produce a power fetching circuit, the circuit design of the conventional household can be used to provide the same function. In this way, it can be simple, easy, and convenient to achieve intelligent household automation through combining it with the Internet of Things, in realizing energy saving conveniently in households, schools and public buildings.

Moreover, a further advantage of the present invention is that, in the present invention, the bi-directional single fire-wire phase-front AC power fetching is adopted. In which, AC power fetching is achieved through voltage division of the lamp load. For an AC power supply of 50 Hz/60 Hz, the AC power fetching is performed twice, while in this period, there is no need to disconnect the lamp load, to reduce the EMI noises effectively. As such, when the power for the lamp load is increased, the EMI noise will not be increased.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A single fire-wire phase-front dynamic AC power fetching module, comprising: two series-connected type synchronous power fetching circuits connected in parallel, and an electronic switch connected thereto, one series-connected type synchronous power fetching circuit is used to perform positive phase AC power fetching, while the other series-connected type synchronous power fetching circuit is used to perform negative phase AC power fetching; the one series-connected type synchronous power fetching circuit includes a synchronous rectifier outside power supply unit, a synchronous rectifier inside power supply unit, a synchronous AC voltage control unit, a FET driven zero-crossing control unit, a synchronous load dynamic regulating unit, and a synchronous zero-crossing AC power fetching unit, wherein a bi-directional dynamic full-bridge type power fetching design is adopted, such that on a single fire wire, power fetching is performed twice in a cycle of AC, a duration of power fetching is regulated automatically depending on a load, to compensate for the power, and supply it to an outside circuit as a basic power supply;

wherein, one end of the synchronous rectifier outside power supply unit is connected to the fire wire of a power supply, while the other end is connected to a stable DC voltage output end; one end of the synchronous rectifier inside power supply unit is connected to the fire wire of a power supply, while the other end of the synchronous rectifier inside power supply unit is provided with a first branch connecting to one end of the synchronous load dynamic regulating unit and the synchronous AC voltage control unit, and the other end of the synchronous rectifier inside power supply unit is further provided with a second branch connecting to the FET driven zero-crossing control unit and the synchronous zero-crossing AC power fetching unit, and the other end of the synchronous load dynamic regulating unit; one end of the FET driven zero-crossing control unit is connected to the second branch of the synchronous rectifier inside power supply unit, and the one end of the FET driven zero-crossing control unit is also connected to and controls the synchronous zero-crossing AC power fetching unit; while the other end of the FET driven zero-crossing control unit is connected to and controlled by the synchronous AC voltage control unit; and the synchronous zero-crossing AC power fetching unit is connected to and controlled by the FET driven zero-crossing control unit, and the synchronous zero-crossing AC power fetching unit is provided with a power fetching synchronous sampling end, connected to and controls the synchronous load dynamic regulating unit and the synchronous AC voltage control unit, in addition, one end of the synchronous zero-crossing AC power fetching unit is connected to the fire wire through the electronic switch, while the other end of the synchronous zero-crossing AC power fetching unit is connected in parallel to the synchronous zero-crossing AC power fetching unit of the other series-connected type synchronous power fetching circuit;

wherein, the fire wire is provided with an input end and an output end, the synchronous zero-crossing AC power fetching unit of the series-connected type synchronous power fetching circuit is connected to the input end of the fire wire, while the synchronous zero-crossing AC power fetching unit of the other series-connected type synchronous power fetching circuit is connected to the output end of the fire wire; the synchronous rectifier outside power supply unit and the synchronous rectifier inside power supply unit of one series-connected type synchronous power fetching circuit are connected to the input end of the fire wire; while the synchronous rectifier outside power supply unit and the synchronous rectifier inside power supply unit of the other series-connected type synchronous power fetching circuit are connected to the output end of the fire wire; the other ends of the two synchronous rectifier outside power supply unit are connected in parallel, to form a stable DC voltage output end.

2. The single fire-wire phase-front dynamic AC power fetching module as claimed in claim 1, wherein the electronic switch is formed by a relay or a silicon control crystal (TRIAC) controlled by a microcontroller unit (MCU) microprocessor.

3. The single fire-wire phase-front dynamic AC power fetching module as claimed in claim 1, wherein AC current flowing through the single fire wire has a voltage within the range 90V-260V (50 Hz or 60 Hz), to provide DC power of at least 3.3V at 350 mA from the stable DC voltage output end.

4. The single fire-wire phase-front dynamic AC power fetching module as claimed in claim 1, further comprising: a sensor, connected to the electronic switch, to send sensing signals to the electronic switch to perform switching.

5. The single fire-wire phase-front dynamic AC power fetching module as claimed in claim 1, further comprising: a wireless communication module, connected to the electronic switch, and is selected from one of the following: a Blue tooth wireless module, a Zigbee wireless module, a Z-wave wireless module, a RF2.4G wireless module, a 433 MHz wireless module, and a Wi-Fi wireless network module.

<p style="text-align:center">* * * * *</p>